Aug. 2, 1955  G. R. HARRIS  2,714,480
LUGGAGE CARRIER
Filed Aug. 7, 1952

INVENTOR:
G. R. Harris
BY OOMartin.

ATTORNEY

United States Patent Office 2,714,480
Patented Aug. 2, 1955

2,714,480

LUGGAGE CARRIER

George R. Harris, Montrose, Calif.

Application August 7, 1952, Serial No. 303,106

2 Claims. (Cl. 224—42.1)

The present invention has relation to improvements in luggage carriers of the type which are mountable on the top surface of closed automobile bodies. This application is a continuation in part of application, Serial No. 250,420, filed on October 9, 1951.

It is the general object of the invention to provide a simple, sturdy and inexpensive luggage carrier which may quickly be mounted in position on a car and as readily removed therefrom without appreciably affecting the glossy paint of the car top. More particularly it is the object of the invention to provide a one-piece luggage carrier which is so light that it may be handled by the car owner and placed in position on the car top by him without great effort. A further object is to provide a one-piece carrier which is so sturdy that it will support ordinary loads of luggage over extended periods of time without buckling or otherwise showing signs of distortion.

Figure 1:
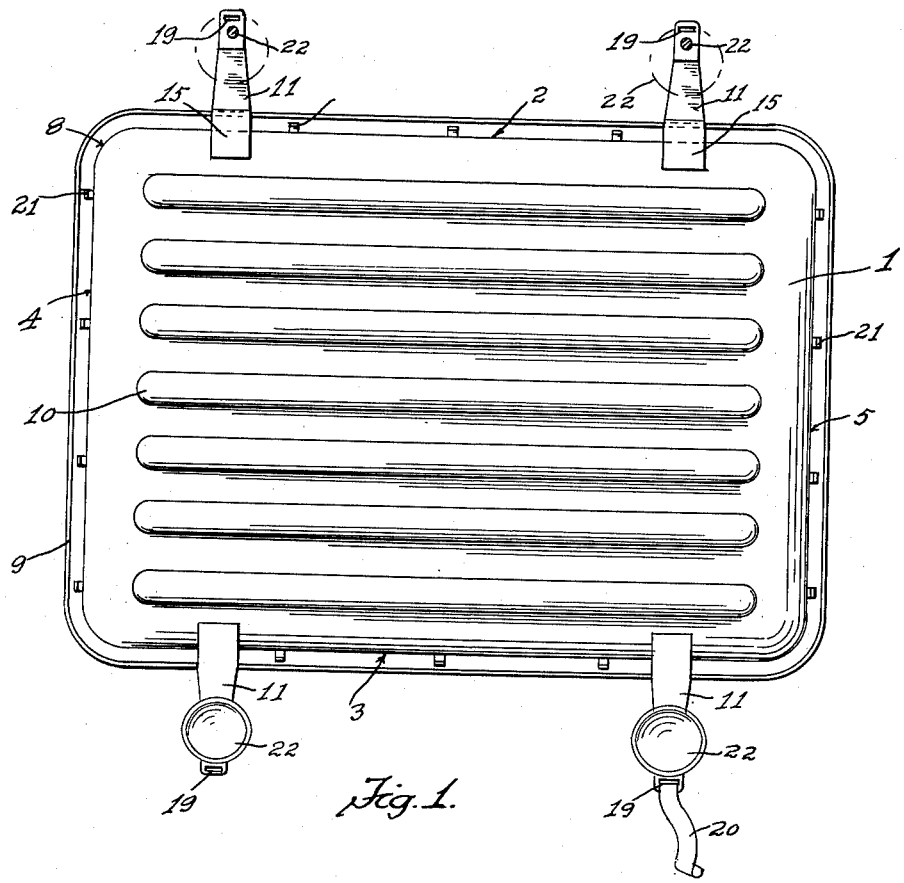
Figure 2:
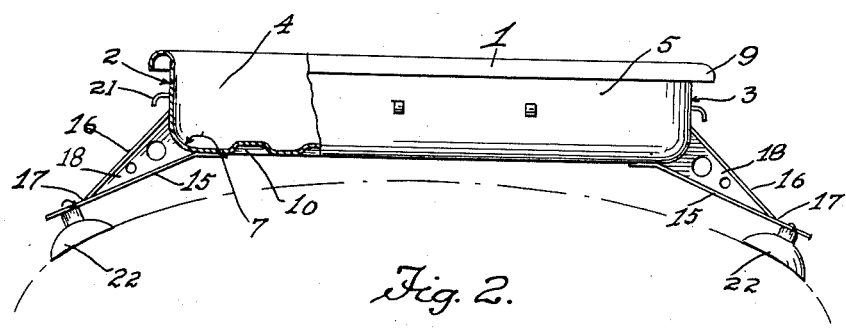

To this end the invention resides in the combination hereinafter fully described and illustrated in the accompanying drawing, of which:

Fig. 1 is an inverted plan view of a luggage carrier embodying the invention; and Fig. 2 is a substantially corresponding end view of the device.

The carrier includes a luggage receiver 1, which is made from thin sheet metal drawn into the shape of a shallow tray having its side flanges 2, 3 and end flanges 4, 5 substantially perpendicular to the bottom 6 thereof. The bottom corners 7 and flange corners 8 are well rounded to present a pleasing appearance and also in order that no sharp corners may be present within which dirt and dust would be free to accumulate. When so shaped, it is possible to draw the receiver out of very tough material, such as stainless steel, and it is also possible to fold over the top edge of the receiver to form a continuous, unbroken roll-edge 9 which not only adds to the sturdiness of the carrier but also serves to protect the hands of the person mounting the carrier as well as the luggage loaded into and unloaded from the receiver. The bottom of the tray is shown formed with corrugations 10 lengthwise thereof, thereby materially to strengthen the receiver. All of the foregoing is shown and described in my said prior application.

Brackets 11 project from both sides of the tray and each bracket includes a plate 15 which extends laterally and downwardly from the rounded corners of carrier bottom. Braces 16 extend downwardly from the side flanges 2, 3 to a point 17 near the outer ends of the plates 15; in addition to which a web 18 is vertically seated to bridge the space between the plate and the brace of each bracket. All of these parts are integrally combined with the carrier tray to form sturdy extensions or legs which will withstand all the stresses such carrier may be subjected to while in service. The projecting ends of the plates 15 may be perforated, as indicated at 19, to provide anchoring positions for straps 20 such as ordinarily used to steady luggage carriers on car tops. It will also be found advantageous to project a number of hooks from the side and end flanges of the receiver, as indicated at 21 in the drawing, for use in tying luggage more securely in position therein. Rubber suction cups 22 are rigidly mounted on the underside of the plates 15, directly within the perforations 19 thereof, for engagement with the curved side edges of the automobile top. When the angle of inclination of these suction cups conforms substantially to the curvature of the side edges, as indicated in Fig. 2, it is found that the carrier will be held firmly in position. The function of the straps 20 is then merely to prevent dislodgment of the suction cups due to excessive side pressure or shocks against the sides of the carrier.

It is seen from the foregoing description that I have provided a very simple and inexpensive one-piece luggage carrier which is very much sturdier than the wire basket carriers ordinarily used and which is held so rigidly in position on the top of the automobile that no pressure or shock will alter the position thereof while the straps remain in engagement with the drain gutters 23 of the automobile top.

I claim:

1. For attachment to the curved top surface of an automobile having drainage gutters along the curved side edges thereof, a one-piece sheet metal luggage carrier in the form of a shallow tray having vertically directed side and end flanges, the bottom corners of the tray being well rounded, brackets integral with and extending from the rounded corners of the tray near the ends of the side flanges thereof, the brackets having transverse perforations at the ends thereof for receiving straps engaging said gutters to lock the carrier in position on the top of the car, each bracket consisting of a plate laterally extending from the bottom surface of the tray, a brace extending from the flange of the tray to the plate at a point directly within the transverse perforation thereof and a web bridging the space between the brace and plate, and suction cups secured to the underside of said brackets near the outer ends thereof, the brackets being downwardly and outwardly directed to tilt the suction cups into position for correct engagement with the curved top surface of the car.

2. For attachment to the curved top surface of an automobile, a one-piece sheet metal luggage carrier in the form of a shallow tray having vertically directed side and end flanges, the bottom corners of the tray being well rounded, brackets integral with and extending from the rounded corners of the tray near the ends of the side flanges thereof, each bracket including an upper plate downwardly and outwardly extending from the side flange, a lower plate extending from the bottom surface of the tray to and beyond the outer end of the upper plate, a web vertically bridging the space between the upper and lower plates, the inner end of the web fittingly engaging the rounded corner of the tray, and a suction cup projecting from the underside of each bracket at the outer end thereof at the proper angle fittingly to engage the curved top surface of the car.

References Cited in the file of this patent

UNITED STATES PATENTS

| 2,109,571 | Le Boeuf | Mar. 1, 1938 |
| 2,594,319 | Law | Apr. 29, 1952 |
| 2,596,860 | McCrory et al. | May 13, 1952 |

FOREIGN PATENTS

| 853,371 | France | Dec. 7, 1939 |
| 1,004,579 | France | Nov. 28, 1951 |